United States Patent [19]
Nakayama et al.

[11] Patent Number: 5,273,318
[45] Date of Patent: Dec. 28, 1993

[54] VEHICLE MUDGUARD

[75] Inventors: Takeshi Nakayama; Shigeo Kuriyama, both of Kanagawa, Japan

[73] Assignee: Bridgestone Corporation, Tokyo, Japan

[21] Appl. No.: 960,205

[22] Filed: Oct. 13, 1992

Related U.S. Application Data

[63] Continuation of Ser. No. 592,050, Oct. 3, 1990, abandoned.

[30] Foreign Application Priority Data

Oct. 13, 1989 [JP] Japan ................. 1-267504

[51] Int. Cl.$^5$ ................................ B62D 25/16
[52] U.S. Cl. ........................ 280/851; D12/185
[58] Field of Search .......... 280/847, 848, 849, 851, 280/852, 152.3; D12/184, 185

[56] References Cited

U.S. PATENT DOCUMENTS

| | | | |
|---|---|---|---|
| 3,852,108 | 6/1971 | Carlton | 280/851 |
| 3,922,003 | 11/1975 | Lea | 280/851 |
| 4,013,302 | 3/1977 | Oswald | 280/851 |
| 4,205,861 | 6/1980 | Roberts et al. | 280/851 |
| 4,382,606 | 5/1983 | Lightle et al. | 280/851 |
| 4,398,739 | 8/1983 | McKenzie et al. | 280/851 |
| 4,690,419 | 9/1987 | Hoshal | 280/851 |
| 4,722,541 | 2/1988 | Gray et al. | 280/851 |

FOREIGN PATENT DOCUMENTS

| | | | |
|---|---|---|---|
| 0202059 | 11/1986 | European Pat. Off. | 280/851 |
| 3539146 | 5/1987 | Fed. Rep. of Germany | 280/851 |
| 3613577 | 10/1987 | Fed. Rep. of Germany | 280/851 |
| 0020374 | of 1905 | United Kingdom | 280/852 |
| 2078181 | 1/1982 | United Kingdom | 280/851 |
| 2132148 | 7/1984 | United Kingdom | 280/851 |
| 2182900 | 5/1987 | United Kingdom | 280/851 |
| 2208160 | 3/1989 | United Kingdom | 280/851 |

Primary Examiner—Brian L. Johnson
Attorney, Agent, or Firm—Jordan and Hamburg

[57] ABSTRACT

A vehicle mudguard comprises a front member having openings facing the tire and a back member arresting and draining water which has passed through the openings. A space is formed between the front and back members. One embodiment has vertically spaced draining ribs fitted on the front part of the back member and a plurality of projections arranged, at least, among the draining ribs. A second embodiment has a water-permeable middle member having a three-dimensional, irregular-shaped foam structure situated in a space between the front and back members.

6 Claims, 9 Drawing Sheets

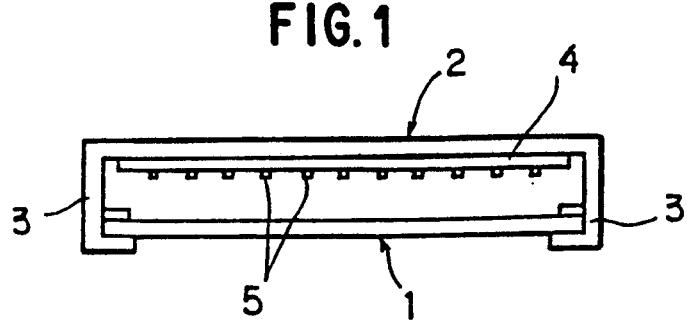
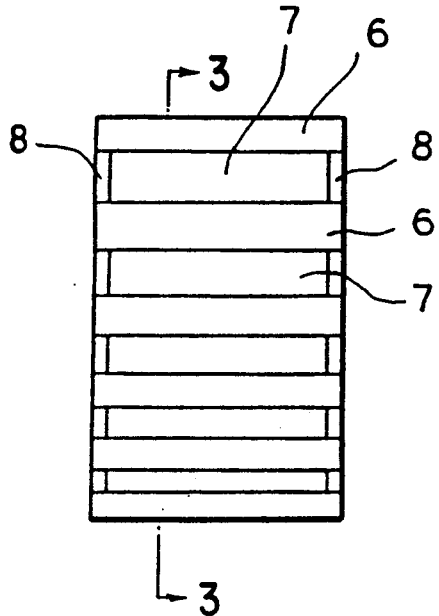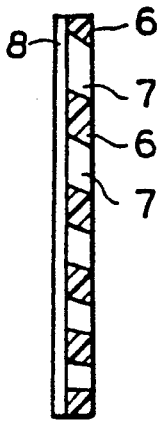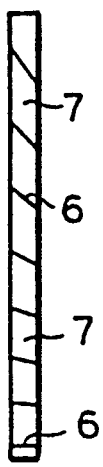
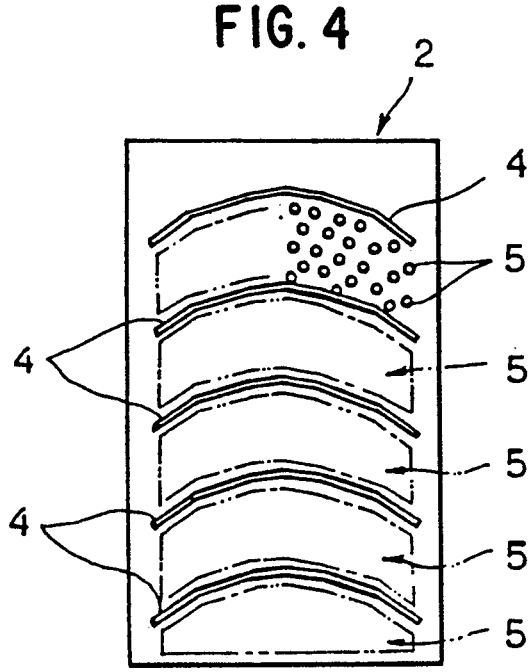

MUDDY WATER

VEHICLE MUDGUARD

This application is a continuation of application Ser. No. 07/592,050, filed Oct. 3, 1990 now abandoned

BACKGROUND OF THE INVENTION

1. Field of the Invention

The present invention relates to a vehicle mudguard for attachment behind a tire in order to mainly prevent vehicle paint from becoming dirty and coming off due to muddy water and pebbles splashed up by the tire, to protect the electric wiring of the vehicle, and to insure safe driving of following vehicles by preventing splashing.

2. Description of the Prior Art

Concerning conventional vehicle mudguards, a vehicle spray inhibitor disclosed in U.K. Patent Application GB 2, 132, 148A is generally known. However, its construction is complicated and yet insufficient for preventing the scattering of muddy water.

SUMMARY OF THE INVENTION

An object of the present invention is to provide a vehicle mudguard making it possible to effectively prevent the scattering of muddy water with a relatively simple construction.

In order to achieve the above-mentioned object, the present invention comprises a front member having openings facing the tire side, a back member arresting and draining water which has passed through the openings, a space between the members, vertically spaced draining ribs fitted on the front part of the back member and a plurality of projections arranged, at least, among the draining ribs. In addition, the present invention comprises a front member having openings facing the tire side, a back member arresting and draining water which has passed through the openings, a space between the members, and a middle member having water permeability as well as a three-dimensional, irregular-shaped foam structure situated in the space.

When the mudguard of the present invention is fitted to just behind a tire, muddy water splashed by the tire strikes against the front member with great force. However, as openings are formed on the member, except for some of the muddy water which adheres to the member, the greater part of it passes through the member. Water which has passed through the openings hits the back member, and the projections formed on the front part of the back member absorb incident energy of the water, and the draining ribs guide the water so that it drops onto a road surface. In the case of the mudguard having the middle member, the middle member serves as a buffer for the water which strikes it, and causes most the water to drop onto the road surface without splashing. Accordingly, muddy water splashed by the tire is prevented from splattering, and the vehicle body is prevented from becoming dirty, and safe driving of following vehicles can be insured. In addition, as the mudguard of this invention has the above-mentioned configurations, the construction thereof is comparatively simple, and it can be made at a low cost.

BRIEF DESCRIPTION OF THE DRAWINGS

FIG. 1 is a plan view of a first embodiment of the present invention;

FIG. 2 is a front view of a front member;

FIG. 3(a) is a sectional view of the front member taken along line 3—3 in FIG. 2;

FIGS. 3(b) and (c) are sectional views similar to FIG. 3(a) except using lateral members of which shapes are different from those of FIG. 3(a);

FIG. 4 is a front view of a back member;

DETAILED DESCRIPTION OF THE PREFERRED EMBODIMENTS

Figure 5:
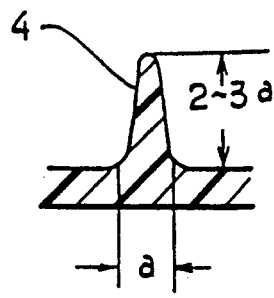
FIG. 5 is a sectional view of a draining rib.

Preferred embodiments of the present invention will now be described with reference to the accompanying drawings;

A first embodiment shown in FIG. 1 consists of a front member 1 be attached to right behind the tire and a back member 2 fitted to the back side of the front member 1 with a space between the two members. An L-shaped part 3 is formed on each side of the back member 2 to fix the front member 1. Draining ribs 4 are fitted on the front part of the back member 2 with spacing therebetween in the vertical direction, and a plurality of projections 5 are arranged among the draining ribs 4. As shown in FIG. 2 and FIG. 3(a), lateral members 6 are arranged at intervals on the front member 1, and openings 7 are formed between the lateral members 6. The lateral members 6 may be directly fitted to the L-shaped parts 3 or to the longitudinal members 8 as illustrated. In the first embodiment, the vertical widths of the openings 7 are so formed that the width of the top opening 7 is widest and those of other openings gradually become narrower in the direction toward the bottom opening 7. In addition, the openings 7 incline upward from the front to the backside respectively.

Figure 6:
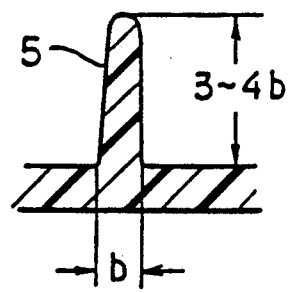
FIG. 6 is a sectional view of a projection.

This is to have muddy water pass efficiently to the back member 2 under the consideration that an incidence angle of muddy water splashed by the tire becomes gradually higher and higher. FIGS. 3 (b) and (c) indicate modifications of the front member 1 using lateral members 6 of which shapes are different. As shown in FIG. 4, five draining ribs 4 each having a shape in which both ends thereof decline gradually downward from the center are arranged on the back member 2 at regular intervals in the vertical direction. And many projections 5 are formed between the draining ribs 4 and below the lowest draining ribs 4. The height of each of the draining ribs 4 is two to three times as great as the width "a" of its base, as shown in FIG. 5. The height of the projections 5 is each, as shown in FIG. 6, three to four times as great as width "b" of its bases. The diameter of the top of the projections 5 is set at ⅓b to ½b. The projections 5 are not always formed vertically with respect to the base of the back member 2, but may irregularly incline from the vertical within the range of 3°–12°. An ideal number of the projections 5 is two to six per 1 cm². When the number is increased to more than that, the draining efficiency decreases on the back member 2. Both ends of each of the draining ribs 4 decline downwardly, which makes muddy water hitting against the back member 2 drop onto the road surface.

The front member 1 and the back member 2 may be fabricated from metal sheet such as stainless steel. It is, however, desirable that these be formed of such materials as polypropylene, high-density polyethylene, EVA, PVC, rubber and thermoplastic elastomer from the standpoint of light weight and safety in the event the mudguard is damaged and falls from the vehicle. The openings 7 of the front member 1 are required to be approx. 50 percent open relative to the total surface area thereof.

Figure 7:
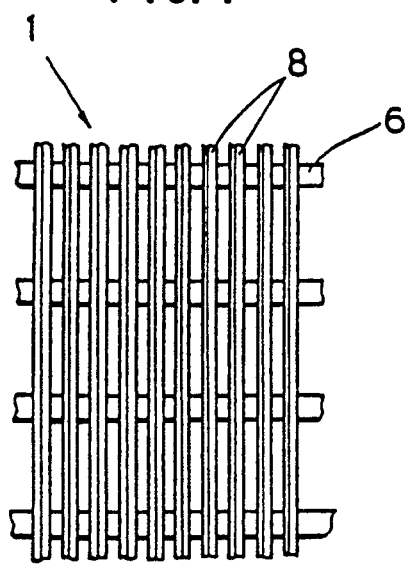
FIG. 7 is a front view of a modification of the front member.
Figure 8:
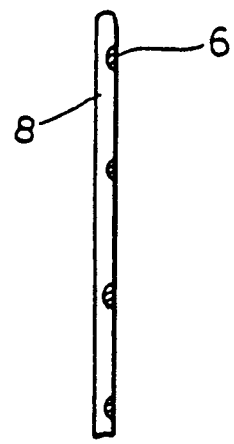
FIG. 8 is a side view of FIG. 7.
Figure 9:
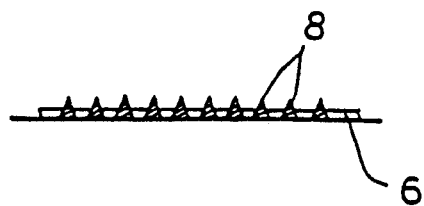
FIG. 9 is a bottom view of FIG. 7.

FIGS. 7 to 9 show modifications of the front member 1 consisting of the lateral members 6 and the longitudinal members 8 positioned in front of the members 6. Although in these figures, longitudinal members 8 in triangular cross section are employed, ones quite round or oval in cross section may be used. The same applies to the lateral members 6.

Figure 10:
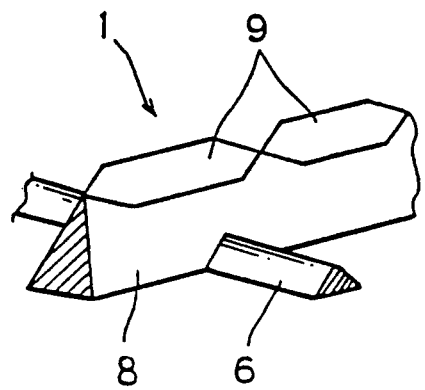
FIG. 10 is a perspective view of another modification of the front member.
Figure 11:
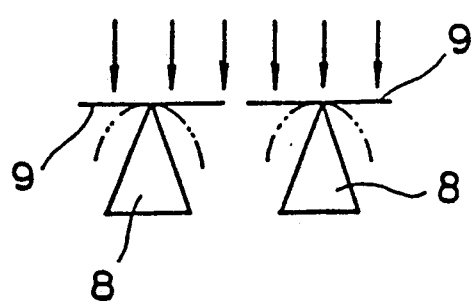
FIG. 11 is a view illustrating an action of membranes shown in FIG. 10.
Figure 12:
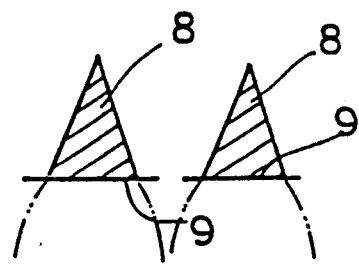
FIG. 12 is a sectional view illustrating an embodiment in which the membranes are fitted on the backside of longitudinal member.

In the front member 1 shown in FIG. 10, membranes 9 are fitted on the front side of the longitudinal member 8 of triangular cross section and are to be bent backward by hydraulic pressure of muddy water splashed by the tire as illustrated in FIG. 11 surface films 9 are to be bent backward by the. The membranes 9 as mentioned above may be fitted onto the backside of the longitudinal members 8 (see FIG. 12). Further, the membranes 9 may be fitted on the top of the lateral members 6 situated on the front side or on the base of the members 6 situated on the backside in order to cover part of the openings 7. The presence of the membranes 9 is effective for reducing rebounding of muddy water.

Figure 13:
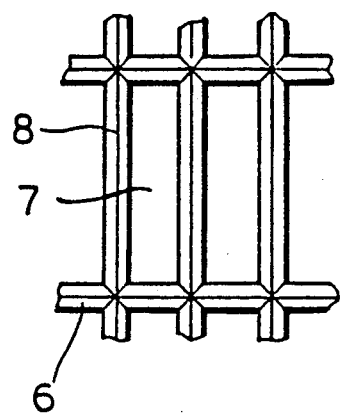
FIGS. 13 to 16 are front views of other modifications of the front member.
Figure 14:
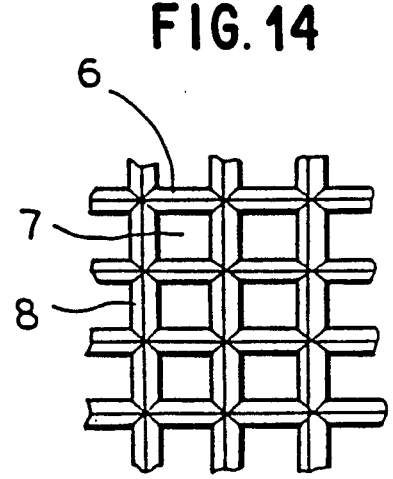
Figure 15:
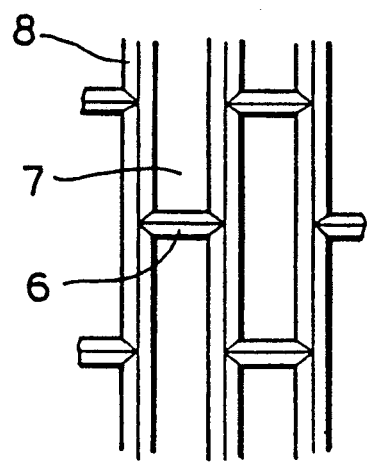
Figure 16:
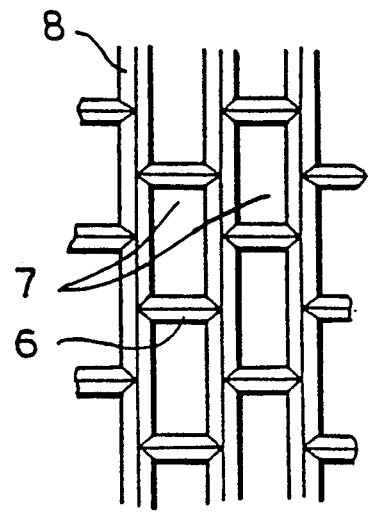

FIGS. 13 to 16 show respective modifications of the front member 1: FIG. 13 shows the rectangular openings 7 formed by the longitudinal members 8 and the lateral members 6, while FIG. 14 shows the square openings 7. FIGS. 15 and 16 show staggered rectangular openings 7.

Figure 17:
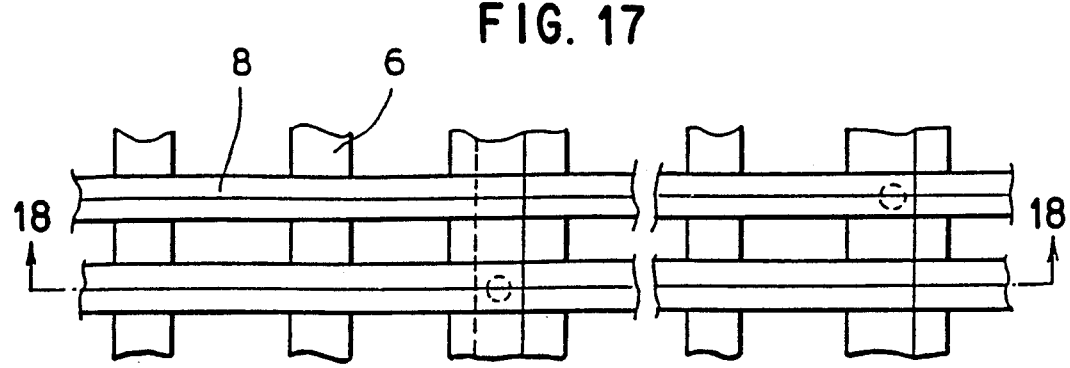
FIG. 17 shows front views of an example in which several units of the front member are first manufactured and then joined together.
Figure 18:
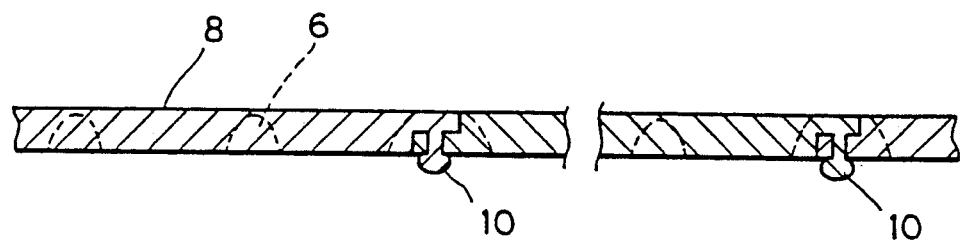
FIG. 18 is a sectional view of the front member taken along line 18—18 in FIG. 17.

In case the front member 1 is fabricated by monoblock forming, molds thereof become complicated and are limited in dimensions. Therefore, FIGS. 17 and 18 illustrate examples in which unit members composing the front member 1 are first molded, and then molded unit members are joined together using snap members 10.

Figure 19:
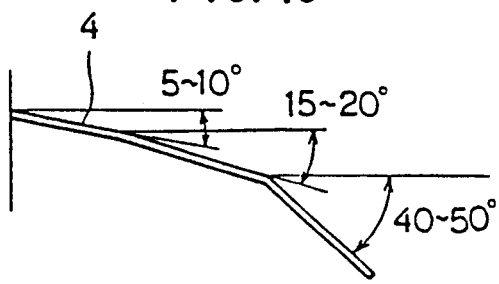
FIGS. 19 to 21 are front views showing a few examples of the draining rib.
Figure 20:
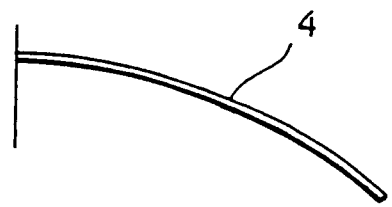
Figure 21:
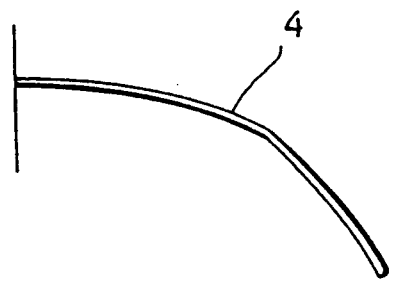

FIGS. 19 to 21 show different shapes (half) of the draining ribs 4 fitted onto the back member 2. The draining rib 4 of FIG. 19 is of a shape in which the rib 4 inclines downwardly step by step from the center to right and left thereof. FIG. 20 shows a shape in which the rib 4 inclines gradually downward from the center to right and left in a curved form. FIG. 21 shows a shape of a two-step curved draining rib 4. Intervals between the draining ribs 4 are not necessarily in a uniform pitch arrangement. As the volume of muddy water splashed becomes smaller and smaller with the ascent of the muddy water, the pitch between the upper ribs 4 may be wider.

Figure 22:
FIG. 22 is a perspective view of a modification of the projection.
Figure 23:
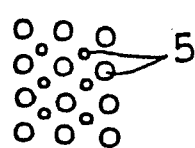
FIGS. 23 to 25 are front views of examples of arrangements of the projections.
Figure 24:
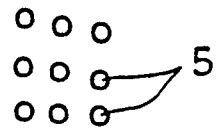
Figure 25:
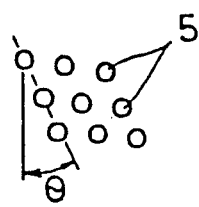
Figure 26:
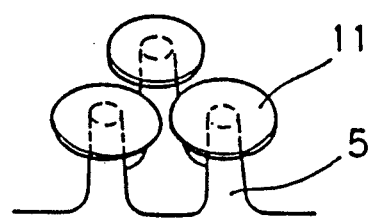
FIG. 26 is a perspective view of an example in which umbrellas are formed on tops of the projections.

FIG. 22 shows the projection 5 formed as a quadrangular pyramid. However, it may be a triangular pyramid, other angular pyramid, oval cone or the like. FIGS. 23 to 25 show examples of arrangement patterns of the projections 5: FIGS. 23 and 24 show examples in which the projections 5 are arranged perpendicularly in the longitudinal direction. FIG. 23 shows an example of a pattern of different-sized projections 5. FIG. 25 shows another example in which inclination θ of the projections 5 is between 30° and 60° with respect to a vertical line. As muddy water hitting the projections 5 drains along narrow spaces among the projections 5, it is needless to say that the arrangement of the projections 5 must be so designed that draining is smoothly carried out. FIG. 26 shows that umbrellas 11 are fitted onto the tops of the projections 5, which performs the function that muddy water entering the narrow spaces among the projections 5 is prevented from rebounding, i.e. the umbrellas 11 fulfill a splash preventing function.

Figure 27:
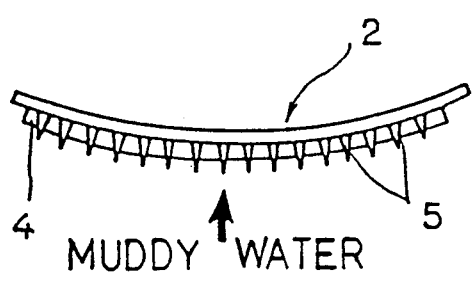
FIGS. 27 to 29 are plan views showing modifications of the back member.
Figure 28:
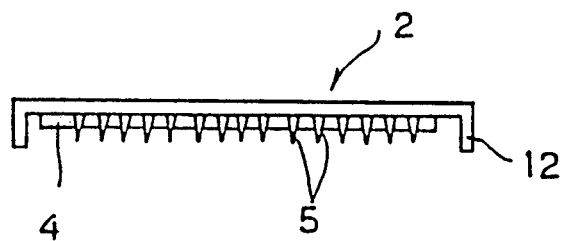
Figure 29:
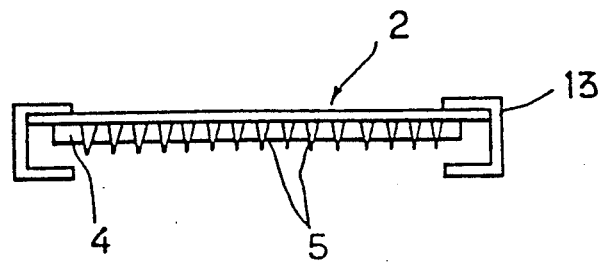

FIGS. 27 to 29 show modifications of the back member 2: The back member 2 shown in FIG. 27 is effective in directing muddy water striking the member 2 to the right and to the left as the both ends thereof curve backward, resulting in an increase of draining effect. The ends of the back member 2 of FIG. 28 are not formed into the L-shaped parts 3 as in FIG. 1 but into simple bends 12. FIG. 29 shows an example in which the ends are not formed into the L-shaped parts 3 nor into the simple bends 12, but into U-shaped members 13.

Figure 30:
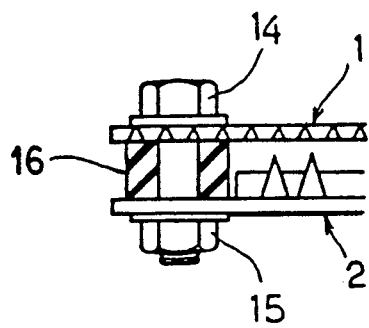
FIG. 30 is a sectional view of an example of fixing together of the front and back members.
Figure 31:
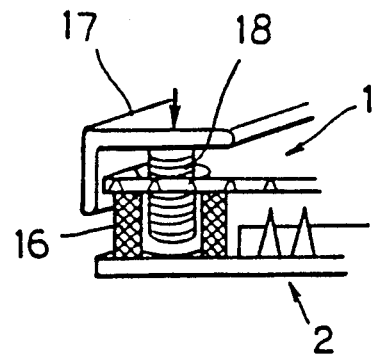
FIG. 31 is a perspective view in partial section of another example of fixing together of the front and back members.
Figure 32:
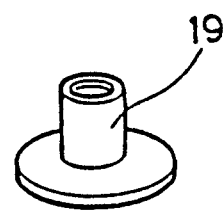
FIG. 32 is a perspective view of a female screw used in the example of FIG. 31.
Figure 33:
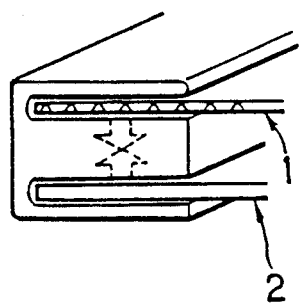
FIG. 33 is a perspective view of yet another example of fixing together the front and back members.
Figure 34:
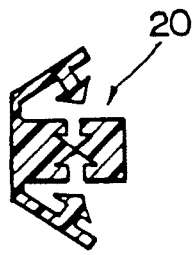
FIG. 34 is a sectional view of a fastening used in FIG. 33.
Figure 35:
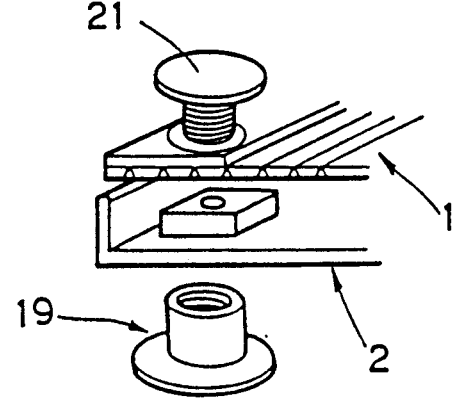
FIG. 35 is an exploded perspective view showing a fixing arrangement.
Figure 36:
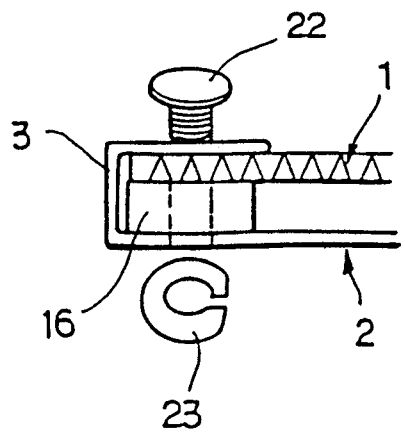
FIG. 36 is a plan view of another fixing arrangement.
Figure 37:
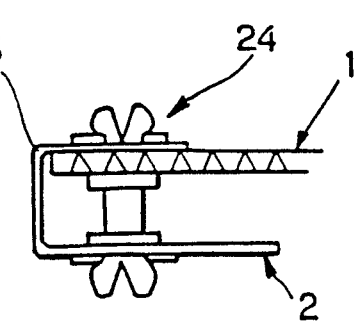
FIG. 37 is a plan view of yet another fixing arrangement.
Figure 38:
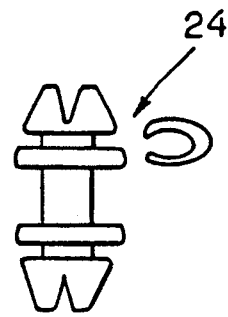
FIG. 38 is a front view of a locking member used in FIG. 37.
Figures 39, 40:
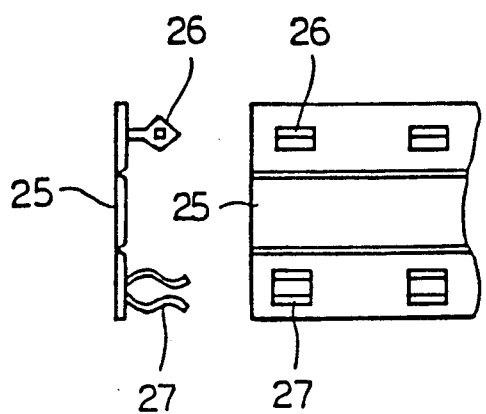
FIGS. 39 and 40 are side and front views of still another fastening.
Figure 41:
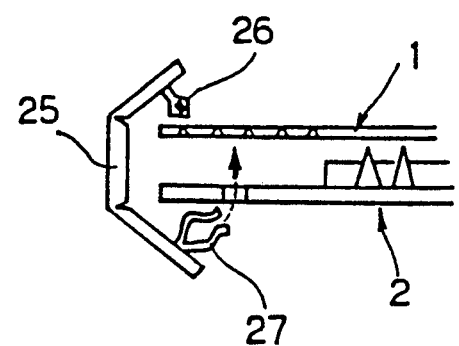
FIG. 41 is an illustration showing that the front and back members are to be fixed together by the fastening of FIG. 39.
Figure 42:
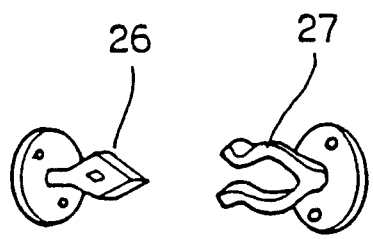
FIG. 42 is a perspective view of another different fastening.
Figure 43:
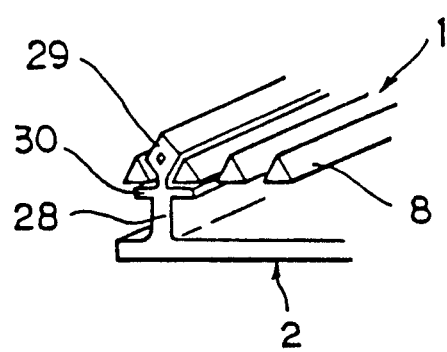
FIG. 43 is a perspective view of yet another different fastening.
Figure 44:
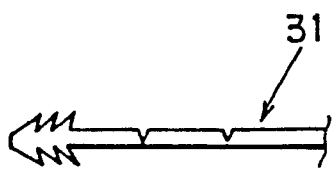
FIG. 44 is a plan view of a fastening section in which still another different fastening is formed on the back member.
Figure 45:
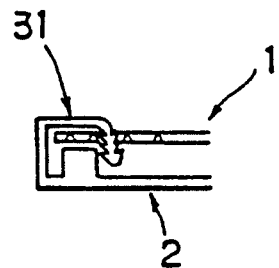
FIG. 45 is a plan view showing a fixing method using the fastening of FIG. 44.
Figure 46:
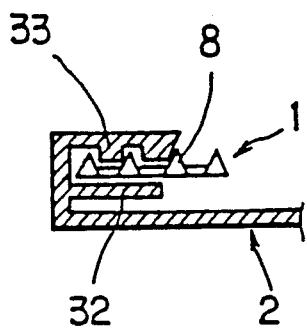
FIG. 46 is a sectional view showing another fixing arrangement.
Figure 47:
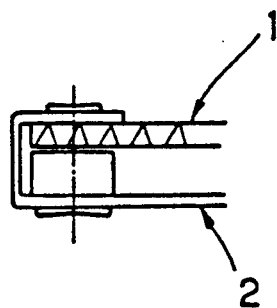
FIG. 47 is a plan view showing yet another fixing arrangement.

FIGS. 30 to 47 show various examples of means to fix together the front member 1 and the back member 2 at a uniform spacing. FIG. 30 shows an example in which the two members are fixed together using a bolt 14 and a nut 15 with the insertion of a rubber spacer 16 between the two members. FIG. 31 shows another example in which the spacer 16 is put between the two members, and a male screw 18 of an L-shaped member 17 is inserted into a female screw 19 placed in the spacer 16 as shown in FIG. 32. FIG. 33 shows yet another example in which the two members are fixed at a predetermined spacing using a fastening 20 made from synthetic resins and the like as shown in FIG. 34. The example of FIG. 35 shows an arrangement in which a male screw 21, after passing through the front member 1, is to be screwed into the female screw 19 after the latter has passed through the back member 2. In this case, the threading may be eliminated and the two members may be fixed together by means of inserting the male part 21 into the female part 19. FIG. 36 shows still another example in which a screw 22 is fixed to a C-ring 23 placed on the backside of the back member 2 after passing through the L-shaped part 3, the front member 1, the spacer 16 and the back member 2 in the order mentioned. FIG. 37 is a further example in which the members are fixed together using a locking device 24 as shown in FIG. 38. FIGS. 39 to 41 show examples in which the front member 1 and the back member 2 are fixed at a uniform spacing using a fastener consisting of a male part 26 and a female part 27 fitted on a plate 25 forming a U shape when bent. FIG. 42 shows an example in which the male part 26 and the female part 27 of FIG. 39 are fabricated separately. FIG. 43 shows another example in which the front member 1 and the back member 2 are fixed at a predetermined spacing which is created by a wall 28 formed on the back member 2 adjacent each side edge thereof. A part 29 of rhombic cross section is formed on the top of each wall 28, and a horizonal strip 30 is formed just under the rhombic part 29. The rhombic part 29 is slid or thrust in between the longitudinal members 8 of the front member 1 thereby to fix the back member 2 to the front member 1. FIG. 44 shows a flexible fastening 31 of a strap type formed on each side edge of the back member 2, and a pointed end of the fastening 31 is inserted into a space between the longitudinal members 8 of the front member 1 as shown in FIG. 45 so that the front and back members are fixed together at a uniform spacing. FIG. 46 shows still another example in which a lower horizontal strip 32 is formed on each side edge of the back member 2, and an upper horizontal strip 33 having grooves, into which the longitudinal members 8 of the front member 1 are to be slid above the lower horizontal strip 32, is formed. FIG. 47 shows yet another example in which the members are fixed by a rivet.

Figure 48:
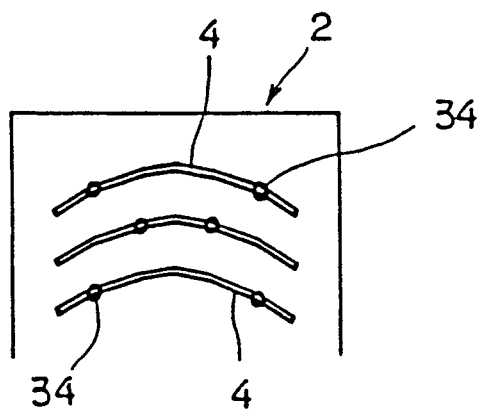
FIG. 48 is a front view of a modification of the back member.
Figure 49:
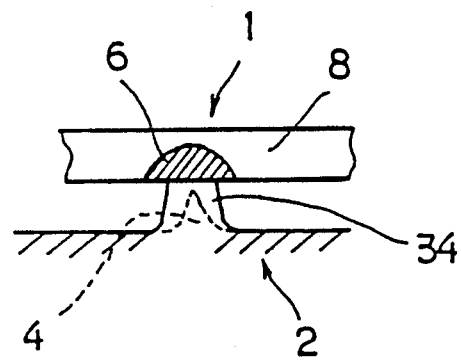
FIG. 49 is a plan view in partial section showing the relation between the front member and the back member of FIG. 48.

In the back members 2 of FIGS. 48 and 49 spacing retaining protrusions 34 are fitted over the draining ribs 4. The protrusions 34 directly come in contact with the lateral members 6 of the front member 1 and keep a regular spacing between the front and back members. In this example, the height of the ribs 4 is 9 mm., and those of the protrusions 34 and the projections 5, illustration of the latter being omitted from FIGS. 48 and 49 for convenience, are 13 mm. and 11 mm. respectively.

Figure 50:
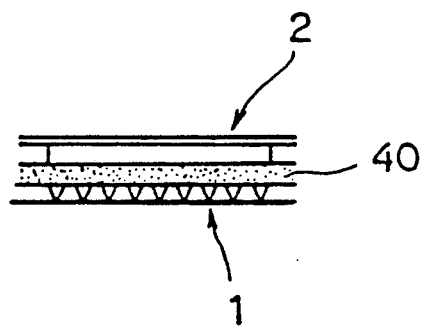
FIG. 50 is a plan view of the mudguard using a middle member.

The mudguard of FIG. 50 illustrates an example in which a middle member 40 is situated in between the front member 1 and the back member 2.

Figure 51:
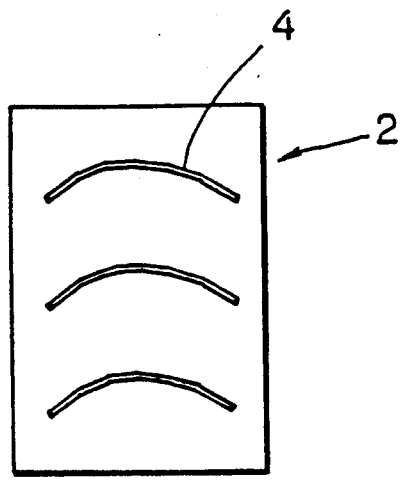
FIG. 51 is a front view of the back member of FIG. 50.

The middle member 40 has water permeability provided by a three-dimensional, irregular-shaped foam structure. Such materials as Scott foam, hessian cloth, hair felt and palm rock are suitable for manufacture of the middle member 40. That is, materials which are light, highly porous, highly flexible and have the characteristic of easily absorbing energy of water are quite suitable. In case of adopting the middle member 40, a back member 2 without projections 5 as shown in FIG. 51 may be used though projections 5 may also be used.

Figure 52:
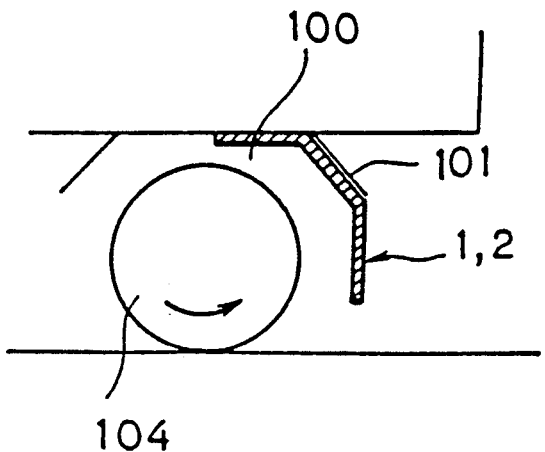
FIG. 52 is a schematic side view showing the mudguard of the present invention attached behind a tire.

FIG. 52 shows an example in which a mudguard of the invention constituted of front and back members 1, 2, respectively, is attached to a wall 101 of a tire housing 100. It is desirable to attach the mudguard so that it extends to near the top of the tire 104.

Figure 53:
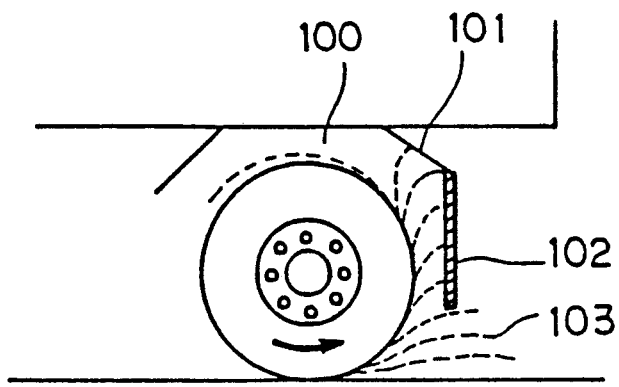
FIG. 53 is a schematic side view showing a prior art mudguard attached behind a tire.

In FIG. 53, a conventional mudguard 102 is suspended from a border of the wall 101 of the tire housing 100, muddy water being projected from the tire being indicated by broken lines 103.

What is claimed is:

1. A mudguard for use on an automotive vehicle to control water splash from the tire of the vehicle running on a wet roadway or in the rain, comprising:

a front member having a plurality of openings formed therethrough and which is to be attached to the vehicle just behind the tire and which has a front for facing toward the tire and a back for facing away from the tire;

a back member fastened to the front member and spaced from the back thereof to define a space therebetween that permits the free passage of water between the front member and the back member, the back member receiving and draining water passing through said openings and having a front facing the back of the front member;

a series of laterally extending draining ribs provided at the front side of said back member, the ribs being vertically spaced from each other when the mudguard is attached to the vehicle, each of said ribs gradually descending starting at a center thereof on a vertical center line toward opposite ends thereof; and a plurality of pin-like projections disposed on the front of said back member vertically beneath said draining ribs in a vertically and lateral extending array;

said front member being comprised of a plurality of horizontally spaced vertically extending members and vertically spaced laterally extending members interconnected with the vertically extending members to form a network and the openings are spaces defined by the network.

2. A mudguard according to claim 1, wherein said projections are greater in height than said draining ribs.

3. A mudguard according to claim 1, wherein said ribs have bases and have a height two to three times greater than the width of the respective bases.

4. A mudguard according to claim 1, wherein the projections are distributed at a frequency of two to six per $cm^2$.

5. A mudguard according to claim 1, further comprising membranes fastened to at least some of the members forming the network, the membranes being sufficiently flexible so as to flex under the pressure of water splashed by the tire to substantially restrict those of the openings adjacent the membranes.

6. A mudguard for use on an automotive vehicle to control water splash from the tire of the vehicle running on a wet roadway or in the rain, comprising:

a front member having a plurality of openings formed therethrough and which is to be attached to the vehicle just behind the tire and which has a front for facing toward the tire and a back for facing away from the tire;

a back member fastened to the front member and spaced from the back thereof to define an empty space therebetween for the free passage of water from the front member to the back member, the back member receiving and draining water passing through said openings and having a front facing the back of the front member;

a series of laterally extending draining ribs provided at the front side of said back member, the ribs being vertically spaced from each other when the mudguard is attached to the vehicle, each of said ribs gradually descending starting at a center thereof on a vertical center line toward opposite ends thereof, said ribs having bases and have a height two to three times greater than the width of their respective bases; and a plurality of pin-like projections disposed on the front of said back member vertically beneath said draining ribs in a vertically and lateral extending array, said projections being greater in height than said draining ribs, said projections being distributed at a frequency of two to six per $cm^2$;

said front member comprising a plurality of horizontally spaced vertically extending members and vertically spaced laterally extending members interconnected with the vertically extending members to form a network, said openings being formed between said laterally extending members.

* * * * *